United States Patent [19]

Dickstein

[11] 4,075,411
[45] Feb. 21, 1978

[54] VINYL-POLYMERIZABLE SURFACTIVE MONOMERS

[75] Inventor: Jack Dickstein, Huntingdon Valley, Pa.

[73] Assignee: Haven Industries, Inc., Worcester, Mass.

[21] Appl. No.: 580,526

[22] Filed: May 23, 1975

[51] Int. Cl.$^2$ ............................................. C07C 69/54
[52] U.S. Cl. ................................ 560/224; 260/17 R; 560/198; 536/58
[58] Field of Search .................................... 260/486 R

[56] References Cited
U.S. PATENT DOCUMENTS 2,575,440  11/1951  Bradley ............................ 260/486 R Primary Examiner—Paul J. Killos
Attorney, Agent, or Firm—Pennie & Edmonds

[57] ABSTRACT

A new class of highly reactive vinyl-polymerizable monomers having surfactant properties is provided by the esters of acrylic, methacrylic and crotonic acids and the mono- and di-esters of maleic, fumaric, itaconic and aconitic acids with (a) $C_8$ - $C_{20}$ alkylphenoxy (ethyleneoxy)$_{10-60}$ethyl alcohol, (b) (ethyleneoxy)$_{15-25}$ sorbitan esters of $C_{12}$ - $C_{20}$ fatty acids and (c) methyl cellulose, hydroxymethyl cellulose hydroxyethyl cellulose and polyvinyl alcohol. The new surfactive monomers are used in emulsion polymerization to provide latexes and copolymers with superior properties.

5 Claims, No Drawings

VINYL-POLYMERIZABLE SURFACTIVE MONOMERS

BACKGROUND OF THE INVENTION

This invention provides a new class of highly reactive vinyl-polymerizable monomers which have properties characteristic of surfactants.

It is well known that surfactants, having both hydrophilic and lipophilic moieties, can be made by balancing these dual functionalities, to serve as emulsifiers to make emulsions of oils in water.

In particular, some surfactants can function as effective agents in the free-radical catalyzed conversion of aqueous emulsions of certain olefinically unsaturated monomers into stable dispersions or latexes of polymer particles. In such processes of emulsion polymerization, present surfactants can, in varying degrees of satisfaction, perform several functions. They can maintain a reservoir of unreacted monomer in the form of emulsified droplets; they can generate sites of polymerization by forming micelles in the aqueous medium; and they can give colloidal stability to the polymerized latex particles by orienting their molecules at the polymer-water interface.

Latexes produced by emulsion polymerization have many uses, particularly as coatings either by themselves or in formulation with pigments and other additives. Thus, they are used, for example, in paints and floor-polishes, and in coatings applied to paper, paperboard, plastic films and the like.

However, when present conventional surfactants are used in effecting emulsion polymerization, inherent difficulties are encountered which are well-known in the art. The very steps which are taken to prepare a stable latex can also lead to deficiencies in performance of the latex in subsequent application. Thus, for example, it is highly desirable in many industrial applications to have latexes with very fine particle size and latexes are therefore commonly prepared by using an amount of surfactant sufficiently large to generate many sites of polymerization. It is then usually necessary to add still more surfactant later to give colloidal stability to the growing particles.

But when the resultant latex is coated and dried on a substrate such as paper, the excessive surfactant in the drying latex does not remain distributed uniformly between the coalescing polymer particles. Instead, the molecules of surfactant exude to the surface of the coating, giving rise to undesirable conditions variously characterized as blooming, blushing and the like. Even when the migrating surfactant molecules do not immediately give an unsightly appearance to the coating, subsequent exposure to moisture may result in "water-spotting". Such behavior is particularly undesirable when the latex is a component of a floor polish or paint.

Various attempts have been made to obtain stable latexes without requiring excess amounts of surfactant. Thus, polar comonomers have been used which, after copolymerization, can contribute to the hydrophilic-lipophilic balance on the latex particles. However, when vinyl sulfonate or various carboxylate monomers such as acrylic or methacrylic acid are used for such purpose, conventional surfactants are generally still required to generate micelles in which the emulsion polymerization can be initiated; and it is extremely difficult to adjust the proportion of such polar comonomers to obtain the desired end-properties of copolymer without having to resort to post-added conventional surfactant for colloidal stability.

SUMMARY OF THE INVENTION

The present invention overcomes the above-described difficulties and provides substances which can function as surfactants in the various conventional steps enumerated above, but which can be captured on the latex particles by vinyl polymerization with the main monomers being polymerized to form the latex. In this manner, the new surfactants are prevented from subsequently migrating like conventional surfactants.

In its broadest form, this invention relates to substances having an olefinically unsaturated, vinylpolymerizable group bonded chemically in a surfactant molecule. These "vinyl-reactive surfactants" can have the properties of respectively nonionic, anionic or cationic surfactants. The present disclosure relates in particular to nonionic substances.

Briefly stated, the nonionic vinyl-reactive surfactants of this invention comprise the esters of acrylic, methacrylic and crotonic acids and the mono- and di- ester of maleic, fumaric, itaconic and aconitic acids with (a) $C_8-C_{20}$ alkyl phenoxy (ethyleneoxy)$_{10-60}$ ethyl alcohols, (b) (ethyleneoxy)$_{15-25}$ sorbitan esters of $C_{12}-C_{20}$ fatty acids and (c) methyl cellulose, hydroxyethyl cellulose, and hydroxymethylcellulose and polyvinyl alcohol.

The instant invention also provides a method of making emulsion copolymers which comprises reacting one or more main vinyl-polymerizable monomers with from about 1 to 10 percent by weight, based on total main monomers, of at least one of the above named surfactive esters.

The instant invention also relates to the latexes thus made by emulsion copolymerization and to the copolymers thus made.

DETAILED DESCRIPTION

The vinyl polymerizable esters of this invention are made by reacting alpha, beta-unsaturated carboxylic acids with any of three general types of surfactants having esterifiable hydroxyl groups namely, the polyoxyethylenealkylphenols, the poly (ethylene oxy) sorbitan esters of fatty acids, the various cellulose derivatives having reactive hydroxyl groups, including methyl cellulose, hydroxymethyl cellulose and hydroxyethyl cellulose, and polyvinyl alcohols of the varying degrees of hydrolysis and molecular weight or viscosity that are commercially available.

Polyoxyethylenealkylphenols have been known in the surfactant industry since before 1940; their preparation by the reaction of ethylene oxide with alkyl phenols is disclosed in U.S. Pat. No. 2,213,477. The literature contains numerous articles and bibliographies on these materials, in particular Chapter 3 by C. R. Enyeart in "Nonionic Surfactants" by M. J. Schick, Marcel Dekker, Inc., New York 1967. The alkyl on the starting alkyl phenol can be any alkyl group, straight-chained or branched, having from 8 to 20 carbon atoms. The most suitable alkyl groups are isooctyl, octyl and nonyl. The preferred alkyl phenol for the purposes of the instant invention is nonyl phenol. Phenols with two or three alkyl groups can also be used. The addition of ethylene oxide to alkyl phenols is known to follow a Poisson distribution and structural formulas used to describe them express an average content.

For the purpose of making the vinyl-reactive surfactive monomers of the instant invention, alkyl phenols having various levels of ethyleneoxylation can be used; broadly they can be selected from the range of materials having an average ethylene oxide content corresponding to from about 10 to 60 mols per mol. For most emulsion polymerization purposes it is suitable to have products corresponding to about 10, 20 and 40 average mols ethylene oxide per mol. Products of this type derived from nonyl phenol are preferred; thus particularly useful products of this invention are nonyl phenoxy (ethyleneoxy)$_{10-40}$ ethyl acrylate, nonyl phenoxy (ethyleneoxy)$_{10-40}$ ethyl methacrylate, nonyl phenoxy (ethyleneoxy)$_{10-40}$ ethyl crotonate and bis [nonyl phenoxy (ethyleneoxy)$_{10-40}$ ethyl]fumarate. Other particularly suitable derivatives of nonyl phenol are the half-esters of maleic, fumaric, itaconic or aconitic acid with nonyl phenol etherified with from 10 to 40 mols of ethylene oxide such as the monoester of nonyl phenoxy (ethyleneoxy)$_{20}$ ethanol with fumaric acid which has a free carboxyl group capable of forming salts and the like in various applications.

The poly (ethylene oxy) sorbitan monooleates and monostearates which can be used in this invention belong to the class which is commonly known as "Tweens". Tweens are fatty acid esters of anhydrosorbitols which have been solubilized by etherifying the free hydroxyl groups with ethylene oxide. The fatty acid moiety can be introduced before, after or during esterification. Sorbitol itself is produced by the hydrogenation of glucose, the commercial products containing a mixture of three anhydrosorbitols. Since they all contain at least two hydroxyl groups, one of these groups is available for esterification with a fatty acid and the others for etherification with ethylene oxide. The fatty acids which are used most suitably in preparing various members of the series are those having 12-20 carbon atoms including lauric, palmitic, oleic and stearic acids. Of these, the oleate and stearate are preferred in making the vinyl-reactive substances of the instant invention. For more details as to the surfactant raw materials of this class, see the review and bibliography on "Polyoxyethylene Polyol Esters" by F. Benson on p. 270 et seq. of "Nonionic Surfactants" edited by Martin Schick and in particular U.S. Pat. Nos. 2,374,931 and 2,380,166. The total mols of ethylene oxide which can be reacted with each anhydrohexitol unit can be varied over a wide range and the distribution of (ethyleneoxy) units among the several available places in the anhydrohexitol unit is statistical. In general, sorbitan monostearates, say, having on the average from about 15 to 25 oxyethylene units per molecule make suitable surfactive monomers by esterification with vinyl-polymerizable unsaturated acids according to the method of this invention.

The third class of hydroxyl-containing surfactants which are esterified by the unsaturated acids in this invention are polymeric surfactants derived from cellulose, namely methyl cellulose, hydroxymethyl cellulose and hydroxyethyl cellulose. Any of these can be used over a wide range of molecular weight and/or viscosity. The degree of alkylation (that is, methylation, hydroxymethylation and hydroxyethylation) can vary from about 0.5 to about 2.5 mols per glucose unit; whereas the degree of esterification by exemplarily acrylic acid can vary from about 0.5 to 1.5 mols per glucose unit, these being average ratios.

The surfactive monomers of this invention are esters of a surfactant alcohol and an olefinically unsaturated acid, and can be made by any of the conventional methods for preparing esters. Thus the alcohol and the acid itself can be condensed in the presence of a catalytic amount (0.5-5%, preferably 2.5-3.5%) of a strong acid such as p-toluene sulfonic acid or orthophosphoric acid, in any suitable inert solvent, such as benzene, hexane, toluene or heptane. Benzene is the preferred solvent for this esterification. The surfactant alcohol and reacting olefinic acid can be used in any molar proportion, it being in some circumstances advantageous to use the alcohol in excess. In general it is preferred to use equimolar quantities of alcohol and acid. Any convenient temperature and pressure can be used; it is particularly convenient to heat the reacting mixture to reflux and to distill off the water formed during esterification.

Other methods of esterification which can be used include alcoholysis by the starting surfactant of the anhydride or an acid halide of the olefinically unsaturated acid, such as reacting methacrylyl chloride with nonyl phenoxy (ethyleneoxy)$_{20}$ ethyl alcohol in a benzene solution containing pyridine or triethylamine; also transesterification of a sulfate ester of the surfactant by the potassium salt of the unsaturated acid. Other means of esterification will occur to those skilled in the art.

In order to minimize the possibility of homopolymerization during the esterification, it is advantageous to have present an effective level of a polymerization inhibitor. The chemical nature of such inhibitor is not critical, any of the inhibitors commonly used in the acrylic monomers of commerce being satisfactory. In general, the proportion of such inhibitor which is present commercially in the particular olefinically unsaturated acid being used is sufficient to prevent homopolymerization both during the esterification reaction and during subsequent storage of the ester. Thus, a level of about 10-200 parts per million based on the weight of reactant vinyl-polymerizable acid is usually adequate, but if desired, an additional 10-200 parts can be added.

Any of the known inhibitors of free-radical polymerization can be used, including hydroquinones, quinones and sterically hindered phenols. Benzoquinones and naphthoquinones can be suitable. Exemplarily, the inhibitor can be hydroquinone, p-tert.-butylcatechol, methyl hydroquinone, di-tert.butylcatechol, 2,4-dinitrochlorobenzene or phenothiazine. Hydroquinine is preferred.

The subject surfactive monomers can be reacted with other "main" vinyl-polymerizable monomers using any conventional emulsion polymerization procedure such as those reported in F. A. Bovey et al, "Emulsion Polymerization" Wiley (Interscience) New York, 1955, or summarized in the chapters by J. W. Vanderhoff, W. F. Fowler, Jr., and Harry K. Stryker et al in G. E. Ham's "Vinyl Polymerization Part II" Marcel Dekker, New York, 1969.

The many parameters of emulsion polymerization technique can be adjusted by those skilled in the art to obtain particular results such as particle size or freeze-thaw resistance (see U.S. Pat. No. 3,721,636). The comonomers can be added to the aqueous phase gradually or in one charge. Initiator can also be added according to a variety of possible schedules. Thus one or more of the comonomers can be emulsified first in the stirred aqueous phase before initiation is begun, or a saturated solution of a gaseous monomer is maintained in the presence of surfactive comonomers and of initiator before comonomers are added gradually with or without additional surfactive monomers. (Compare the method of U.S. Pat. No. 3,644,262.) Monomers can be added continuously or in staggered finite increments. The starting of a run can be in the presence of a previously prepared seed, as in U.S. Pat. No. 3,721,636.

The free radical donors used to initiate the copolymerization can be selected from any of the initiators for aqueous emulsion copolymerization known in the art including those which undergo scission under the influence of heat and those which are caused to form free radicals by reaction with reducing agents. Water-soluble initiators are usually to be preferred including potassium persulfate, sodium persulfate, ammonium peroxydiphosphate, hydrogen peroxide and others which will be known to those skilled in the art. When reducing agents are used, it is preferred to use water soluble materials such as sodium formaldehyde sulfoxylate, sodium metabisulfite and ascorbic acid. The amounts to be used depend upon the desired rate of polymerization and upon other factors well known in the art. Preferably the aqueous emulsifying composition contains between about 0.1 and 5 percent, especially from about 0.2 to 2 percent by weight of initiator. If a reducing agent is used, it also is used in amount totaling between about 0.1 and 5 percent, especially from 0.2 to 2 percent by weight of the finished latex.

While reaction temperature of emulsion polymerization can be varied over a wide range, exemplarily using water or oil circulating through jackets or coils for heating and cooling, it is convenient in the case of monomers like vinyl acetate to use reflux condensation as a means of controlling temperature. As to pressure, atmospheric pressure is convenient for many types of copolymerization, but it is suitable to have superatmospheric pressure to confine gaseous monomers like ethylene or butadiene or easily volatile monomers such as vinyl chloride. Pressure is also useful in certain instances to attain desired levels of solubility of monomers in the polymerizing system. Typical elevated pressures vary from about 50 to 150 psi to 10 atmospheres or more. The usual adjustments to control pH, viscosity and other properties can also be used.

Monomers coreactable with the subject surfactive monomers include both singly and in combination, vinyl acetate, vinyl propionate, the vinyl butyrates, allyl acetate, isopropenyl acetate, styrene, the divinyl benzenes, acrylonitrile, butadiene, isoprene, vinyl pyridine; $C_1 - C_{20}$ alkyl acrylates, methacrylates, itaconates and aconitates and the like, such as methyl acrylate, ethyl acrylate, propyl acrylate, isopropyl acrylate, and amyl acrylates, hexyl acrylates, cyclohexyl acrylate, n-octyl acrylate, decyl acrylate, lauryl acrylate, octadecyl acrylate, 2-ethylhexyl acrylate, stearyl acrylate and their corresponding methacrylates, crotonates, itaconates, and aconitates; as also phenyl acrylate and the diacrylates and dimethacrylates, dicrotonates, etc., of $C_1 - C_{20}$ dialcohols such as exemplarily ethylene glycol, diethylene glycol, or 1,8-n-octyl alcohol; and the multiple (meth) acrylates of polyhydric alcohols such as pentaerythritol; also vinyl chloride, vinyl bromide and vinyl fluoride, vinylidine chloride and vinylidine bromide; ethylene, propylene, tetrachloroethylene, trifluorochloroethylene and the like; and the $C_1 - C_{20}$ alkyl esters and half esters of maleic acid, fumaric acid; also maleic anhydride, maleic acid, fumaric acid, acrylic acid, methacrylic acid, crotonic acid, aconitic acid, and itaconic acid.

The relative proportions of the constituent comonomers copolymerized in the latexes of this invention can be varied over a wide range; specific adjustments of these proportions will occur to those skilled in the art, for the purpose of controlling ease of film-formation, for example, or for modifying end-properties of the copolymer films deposited from the latex, such as flexibility, water-vapor transmissibility and transmissibility of various gases.

In general, the amount of the surfactive monomer of this invention which is copolymerized into the copolymers is between about 1 and 10% based on the total weight of main monomers. More particularly, the amount of surfactive monomer between about 2 and 6% of the weight of total monomer is suitable.

Typical latexes of the instant invention have a solids content between about 15% by weight and about 60% or more, with particle sizes in the range of from about 0.01 to 15 microns as determined by electron microscopy or estimated from light-scattering data. As examples, the emulsion copolymers colloidally suspended in these latexes include polyvinyl acetate having copolymerized therein about 4% by weight of the acrylate ester of a nonylphenoxy poly (ethyleneoxy) ethyl alcohol derived from nonyl phenol and 20 mols of ethylene oxide; also similar copolymers wherein from 20 to 80% of the vinyl acetate is replaced by vinyl propionate or methyl methacrylate or butyl methacrylate, methyl acrylate or dimethyl itoconate; also copolymers of the same surfactive monomer with main monomers having the overall composition 60 parts styrene-40 parts butadiene or 40 parts styrene-60 parts butadiene. Some compositions are more complex; thus in the copolymer made in Example 5 below, the overall ratio of vinyl acetate/dioxtyl maleate/2-ethylhexyl acrylate/surfactive monomer is 76.6/13.1/10.3.

The invention will be further illustrated by description in connection with the following specific examples of the practice of it, wherein as also elsewhere herein proportions are by weight unless otherwise stated.

EXAMPLE 1

To a flask equipped with a stirrer, condenser and Dean & Stark trap, there are added 72 grams (1.0 mol) of acrylic acid; 1101 grams (1.0 mol) of a nonylphenoxypoly(ethyleneoxy)ethyl alcohol derived from nonylphenol and 20 mols of ethylene oxide; 250 ml. of benzene and 11 grams of p-toluene sulfonic acid catalyst. These contents are heated to reflux and refluxing is continued until 18 ml. of water (100% of theoretical) is removed and collected in the trap. The benzene solution is treated with solid anhydrous sodium carbonate, filtered and stripped of solvent to yield a product comprising the acrylate ester $CH_2=CHCO(OC_2H_4)_{20}O(C_6H_4)C_9H_{20}$.

EXAMPLE 2

A flask equipped with a stirrer, condenser and water trap is charged with 1.0 mol (72 grams) of acrylic acid, 425 grams of polyoxyethylene sorbitan monooleate, 300 ml. benzene and 10 grams of p-toluene sulfonic acid catalyst. The mixture is heated at reflux until 18 ml. of water is removed. The remaining benzene solution is treated with solid sodium carbonate, filtered and stripped of the solvent to yield a product comprising the acrylate ester of polyoxyethylene sorbitan monooleate.

EXAMPLE 3

The same procedure is followed as in Example 2, except that in place of the polyoxyethylene sorbitan monooleate there is used 80 grams of a block-polymeric glycol having the structure HO($C_2H_4O$)$_n$($C_3H_6O$)$_{30}$($C_2H_4O$)$_m$H wherein ($C_2H_4O$)$_{n+m}$ is about 80% of the total weight of the glycol. After the solvent is stripped, the product obtained comprises the acrylate ester of the blockpolymeric glycol.

EXAMPLE 4

One mol of the polyoxyethylene derivative of nonylphenol used in Example 1 is placed in a flask together with 400 ml of benzene, 1.0 mol of triethylamine and 1.0 mol of acrylyl chloride. These substances are reacted, with agitation, for three hours, keeping the temperature between 30° and 40° C. The salt formed is filtered off and the benzene is removed from the filtrate under vacuum, to yield a product comprising an acrylate ester substantially identical with that obtained in Example 1.

EXAMPLE 5

Part (i)

Into 38 grams of water at room temperature containing 0.5 grams hydroxyethyl cellulose, 5.0 grams of the reactive surfactant prepared as in Example 1, and 0.003 grams of a conventional silicone-based defoamer, there is added 5.4 grams of a monomer mixture A containing 20.5 grams of vinyl acetate, 3.5 grams of dioctyl maleate and 1.8 grams of 2-ethylhexyl acrylate. A 0.12 gram portion of potassium persulfate is then added and the batch is heated to 82° C. Then, over a period of three hours there is gradually added first the remainder of monomer mixture A followed by a monomer mixture B containing 20.5 grams of vinyl acetate, 3.5 grams of dioctyl maleate and 3.7 grams of 2-ethylhexyl acrylate. A second portion of potassium persulfate, 0.13 grams, is also added. When all the monomers have been added, the batch is heated to about 92° C. and held there for about a half hour until reflux subsides. The unreacted monomers are removed by steam stripping at 91° C. for a period of 15 minutes. A colloidally stable latex having about 55% solids is obtained.

Part (ii)

The procedure of Part (i) is followed in all details except that instead of the 5.0 grams of the surfactant of this invention, there is used 2.5 grams of the conventional surfactant, ethoxylated sodium lauryl sulfate. A stable latex having 55% solids is obtained which is not a part of the instant invention but which is used for comparison purposes in Part (iii) to illustrate the improved properties obtainable with the products of this invention.

Part (iii)

Each of the latexes from Part (i) and Part (ii) respectively, is made into an "interior-flat" latex paint by blending 145 grams of latex with 1008 grams of a 60% pigment dispersion using standard manufacturing techniques. The two latex-based paints are drawn down as films on a plaster-board surface and submitted to conventional paint performance tests. Both have excellent scrub resistance, but the paint made from the latex of Part (ii) is deficient in water resistance. On the other hand, the paint made from the latex of Part (i) prepared with the reactive surfactant of this invention, even though the surfactant was used in twice the concentration of the conventional surfactant, shows excellent resistance to water, both initially and after aging.

EXAMPLE 6

Part (i)

A 10-gallon stainless steel reactor, provided with a propeller agitator is charged with 37.7 parts by weight of deionized water, 0.2 parts of sodium bicarbonate and 0.53 parts of potassium persulfate. The reactor is purged of air, then pressurized with 150 psi of ethylene. The temperature is maintained throughout at 30° C. ± 1°.

A solution is prepared containing 0.060 parts sodium metabisulfite in 0.26 parts of deionized water. One-sixth of this solution is added to the reactor and there is then begun a simultaneous pumping over a period of 11 hours of 53.0 parts vinyl acetate monomer and, in a separate stream, a solution of 3.50 parts of the acrylate ester of the polyoxyethylene adduct of nonyl phenol containing 20 mols of ethylene oxide (made according to the method of Example 1), 0.49 parts sodium metabisulfite in 3.72 parts of deionized water. Polymerization commences almost simultaneously with the start of these simultaneous additions. Over the course of the first 25 minutes, the remaining sodium metabisulfite solution is added in five equal increments. Throughout the addition period, the ethylene pressure in the reactor is maintained at 150 psi. After addition is complete, agitation is continued for 30 additional minutes at 150 psi and 30° C.

Part (ii)

For comparison purposes, a corresponding conventional latex is made by the procedure of Part (i) except that instead of the acrylate ester of polyethylene adduct of nonyl phenol, there is used an equal weight of the conventional surfactant, the unesterified polyethylene adduct of nonyl phenol containing 20 mols of ethylene oxide. The resulting latex is not a product of the instant invention.

Part (iii)

The latexes prepared in Parts (i) and (ii) both are colloidally stable latexes having a solids content equal to about 57.5% and a residual vinyl acetate monomer content of 0.5–0.6%. Average particle size as determined by electron microscopy is substantially the same, about 0.35 microns. The percent ethylene in each polymer is determined by chemical analysis to be 11.1 in both cases. However the polymers deposited from these latexes are substantially different in their resistance to water spotting.

Films of the respective latexes are cast on a clean plate glass surface, using a 6-mil Bird applicator. The films are allowed to dry at 75° F. and 50% R.H. A drop of water is placed on each film and allowed to remain there for ten minutes before being removed by gentle blotting. In the case of the film from the latex of Part (i) no noticeable change in appearances on film structure is observable, in strong contrast to the film from the conventional latex of Part (ii) which is permanently whitened at the place contacted by the water, and which has poor resistance to rubbing at that place.

EXAMPLE 7

Part (i)

The procedure of Example 6, Part (i), is followed except that instead of the surfactant of Example 1 there is used an equal weight of the surfactant formed by esterifying acrylic acid according to the method of Example 2, with polyoxyethylene sorbitan monooleate containing on the average 20 mols ethylene oxide.

Part (ii)

The procedure of Example 6, Part (ii) is followed except that instead of the polyethylene adduct of nonyl phenol there is used an equal weight of polyoxyethylene sorbitan monooleate containing on the average 20 mols ethylene oxide.

Part (iii)

When films of the latexes formed in Parts (i) and (ii) respectively are cast and dried in the manner described in Example 6, Part (iii) it is found that the conventional latex of Part (ii) provides a film which is water sensitive, but the latex of Part (i), made with a surfactant out of the instant invention is resistant to water spotting.

EXAMPLE 8

Part 1

To a pressure kettle equipped with a stirrer and thermometer, there are added 100 grams water, 0.06 grams methyl cellulose methacrylate, 0.05 grams sodium bicarbonate, and 0.08 grams lauroyl peroxide. The kettle was closed up and 5 grams vinyl chloride added. The entire reaction mass was heated to 50° C. and vinyl chloride added while maintaining the pressure at 75±5 psi. A total of 25 grams vinyl chloride monomer was fed. At the end of the reaction, the temperature was raised to 60° C. and maintained for 30 minutes. The pressure was broken after cooling below 35° C. The isolated polyvinyl chloride was dried and tested as described below.

Part 2

The procedure of Part 1 is followed in all details except that the methyl cellulose methacrylate of this invention is replaced by non-esterified methyl cellulose. The polyvinyl chloride obtained is not a part of the instant invention but is used for comparison purposes in Part 3 to illustrate the improved properties obtainable with the products of this invention.

Part 3

Each of the polyvinyl chlorides from Part 1 and Part 2, respectively, is made into a plastisol resin employing 50 parts by weight dioctyl phthalate using standard techniques. The product from Part 1 displayed superior clarity and heat stability on exposure to a temperature of 60°–70° C. for 1 hour. This shows the usefulness of the instant esters in suspension polymerization.

EXAMPLE 9

The procedure of Example 5, Part i, is repeated except that in place of the hydroxyethyl cellulose, there is used an equal weight of the acrylate ester of polyvinyl alcohol prepared by reacting polyvinyl alcohol with acrylic acid according to the method of Example 2.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. Esters of acrylic, methacrylic or crotonic acid with $C_8$–$C_{20}$ alkyl phenoxy (ethyleneoxy) ethyl alcohols.

2. Nonyl phenoxy poly(ethyleneoxy) ethyl acrylate, methacrylate or crotonate having about 10 to 60 ethylene oxide units.

3. Nonyl phenoxy(ethyleneoxy)$_{10-40}$ ethyl acrylate.

4. Nonyl phenoxy (ethyleneoxy)$_{10-40}$ ethyl methacrylate.

5. Nonyl phenoxy (ethyleneoxy)$_{10-40}$ ethyl crotonate.

* * * * *